United States Patent [19]
Thiele

[11] Patent Number: 5,315,663
[45] Date of Patent: May 24, 1994

[54] PASSIVE LOUDSPEAKER ENCLOSURE FOR A TELEVISION RECEIVER

[75] Inventor: Karl-Heinz Thiele, Essinghausen, Fed. Rep. of Germany

[73] Assignee: Electronic-Werke Deutschland GmbH, Villingen-Schwenningen, Fed. Rep. of Germany

[21] Appl. No.: 656,055

[22] PCT Filed: Jun. 14, 1989

[86] PCT No.: PCT/EP89/00667
§ 371 Date: Feb. 8, 1991
§ 102(e) Date: Feb. 8, 1991

[87] PCT Pub. No.: WO89/12946
PCT Pub. Date: Dec. 28, 1989

[30] Foreign Application Priority Data

Jun. 23, 1988 [DE] Fed. Rep. of Germany ....... 3821166

[51] Int. Cl.$^5$ .......................................... H04R 25/00
[52] U.S. Cl. ..................................... 371/188; 381/24; 381/205
[58] Field of Search .................. 381/24, 88, 90, 205, 381/188, 192–204; 181/144, 145, 147

[56] References Cited

U.S. PATENT DOCUMENTS

| | | | |
|---|---|---|---|
| 3,927,261 | 12/1975 | Dahlquist | 181/145 |
| 4,410,761 | 10/1983 | Schickedanz | 381/1 |
| 4,565,905 | 1/1986 | Nation | 381/193 |
| 4,860,370 | 8/1989 | Grosbard | 381/197 |
| 5,119,429 | 6/1992 | Chatelain | 381/188 |

FOREIGN PATENT DOCUMENTS

| | | | |
|---|---|---|---|
| 0204106 | 12/1926 | European Pat. Off. | 381/24 |
| 2102243 | 1/1983 | United Kingdom | 381/24 |

Primary Examiner—Forester W. Isen
Assistant Examiner—Huyen D. Le
Attorney, Agent, or Firm—Joseph S. Tripoli; Peter M. Emanmuel; Frederick A. Wein

[57] ABSTRACT

A Passive loudspeaker enclosure for a television receiver. Interference in the reproduced picture caused by magnetic stray fields from the enclosure occurs, in particular, with color television receivers with 33 inch picture tubes. The task is to reduce the magnetic stray fields by employing simple measures and without using additional components until the interference no longer appears in the picture. In particular, for a loudspeaker enclosure in a television receiver with a 33 inch picture tube.

7 Claims, 2 Drawing Sheets

PASSIVE LOUDSPEAKER ENCLOSURE FOR A TELEVISION RECEIVER

In a television receiver it is known to incorporate within the receiver housing a loudspeaker enclosure for the sound reproduction disposed to the left and the right of the picture tube. Such a loudspeaker enclosure causes magnetic stray fields, and in particular, static stray fields caused by the loudspeaker magnets and dynamic stray fields caused by inductance from divider networks which divide the frequency bands between several loudspeakers. Such magnetic stray fields can cause interference in the picture tube and its circuitry in the form of color purity distortions or changing moving effects. This consists of interference, for example, visible forms which move across the screen in time with the sounds reproduced from the loudspeakers. Other metal parts of the loudspeaker enclosure, for example, hardware, metal loudspeaker frame, diaphragms made from aluminum and similar items, and the like can also influence the magnetic field within the picture tube and thereby lead to picture distortions upon reproduction. This influence on the picture reproduction caused by magnetic stray fields is particularly serious with new types of picture tubes with a screen diagonal size of 33 inches.

It is known to render disturbing magnetic fields ineffective by means of screening in the form of soft iron housings or mu-metal. However, this solution is relatively expensive and in particular with color televisions, cannot be introduced for reasons of cost and weight.

The influence of the magnetic stray field on the picture tube can also be reduced by increasing the distance between the loudspeaker enclosure and the picture tube. However, this solution is also not practicable because the enclosure is arranged within the housing and the size of the housing is restricted.

It is the object of the invention to minimize, on the one hand, the effect of stray fields on the picture tube magnetic fields caused by magnets and inductances, and on the other hand, the influence on the picture tube field caused by metal parts of the loudspeaker enclosure, hardware, frame and diaphragm.

SUMMARY OF THE INVENTION

A passive loudspeaker enclosure for a television receiver is present. Interference in the reproduced picture caused by magnetic stray fields from the enclosure occurs, in particular, with color television receivers with 33 inch picture tubes. The task is to reduce the magnetic stray fields by employing simple measures and without using additional components until the interference no longer appears in the picture. In particular, the exemplary embodiment of the present invention relates to a loudspeaker enclosure in a television receiver with a 33 inch picture tube.

DETAILED DESCRIPTION OF THE PREFERRED EMBODIMENT

Figure 1:
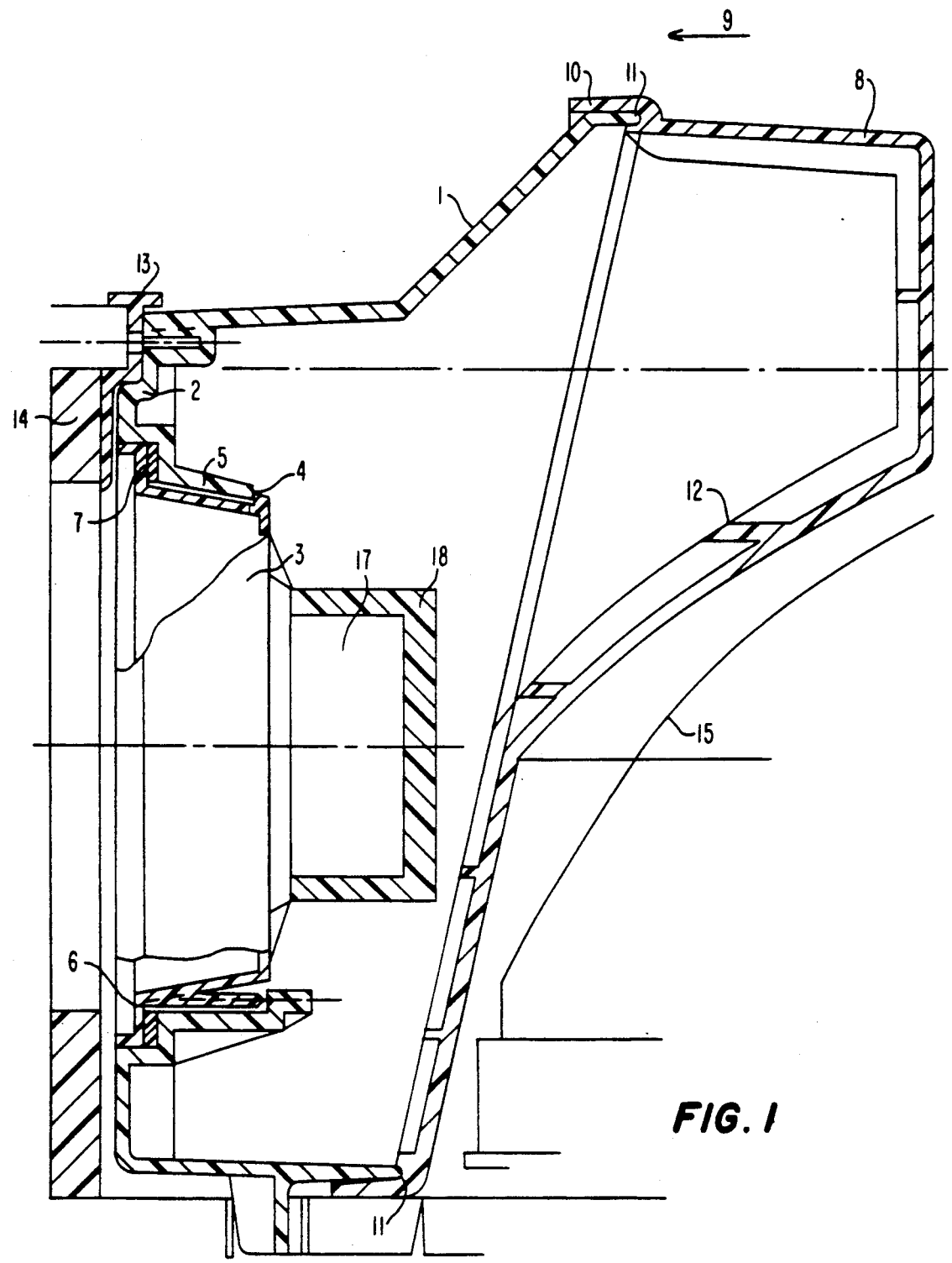
FIG. 1 shows a cross-section of the loudspeaker, the housing and the rear housing component.

The present invention is based on the following knowledge and considerations: For most of the components of an enclosure which contain metal and cause the afore-mentioned interference in the picture tube there exists a suitable alternative solution which is magnetically ineffective and does not cause impairment of the picture reproduction. If all these possible alternatives were made use of, and practically the only metal part left in the enclosure was the loudspeaker magnet provided with a magnetic field screening, then the magnetic interference fields in the picture tube can be brought under control such that the interference described no longer appears during picture reproduction. Therefore, through systematic use and combination of several individually recognized measures, the named task can be solved without significant additional expenditure and without impairing the function of the loudspeaker enclosure.

The housing for the enclosure, which preferably suits the shape of the picture tube, can be assembled from individual housing components without using metal parts, for example, with an adhesive connection or interlocking clip connectors, so-called "snap-in" (clip-fit). Such a solution is described in the German patent application P 37 06 158.5.

The disturbing effect of the unavoidable permanent magnet in the loudspeaker can be brought under control by means of a cup-shaped screening surrounding the magnet and made from a soft iron housing or mu-metal. Such a loudspeaker with a screening for the magnet is, for example, described in DE-GM 17 16 352.

All the remaining components of the loudspeaker can be constructed without using ferro-magnetic metal parts. In particular, the loudspeaker frame and the diaphragm are made from synthetic material. Fixing the loudspeaker to one of the walls of the enclosure is preferably also carried out not using metal parts but by employing interlocking clip connectors in accordance with DE-GM 84 02 128 or DE-OS 35 12 896. The magnetic stray field radiating from the air gap in the loudspeaker can be considerably reduced by using a magneto-fluid within the air gap. This solution is more closely described in DE-OS 30 28 065.

In a multipath enclosure, frequency-selective filters are required in order to divide the complete low frequency band between various loudspeakers, for example, a woofer (bass), a mid-range and a tweeter (treble). Such electrical filters with capacitors and inductances can be replaced by constructional measures at the loudspeaker. By means of a certain design of diaphragm and centering diaphragm, or a particular coupling and connection between these components, it is possible to attain a low-pass effect for the loudspeaker. Further, by employing other methods like, for example, a particular suspension of the diaphragm or additional attenuation material in the path of the sound field in front of the loudspeaker, a particular frequency response can be obtained for the loudspeaker. Such structural solutions for achieving a certain frequency response for the loudspeaker are more closely described in DE-OS 33 34 442, 34 47 745, and 36 41 760.

Furthermore, it has been shown that through a cessation of inductances in the path of the low frequency signal, which inevitably have a low-pass effect for the current, the transient response of the loudspeaker is improved. In addition, the efficiency of such loudspeakers is increased.

With conventional low-pass filters in loudspeakers, which consist of inductances connected in series with moving coils, a frequency fall-off for higher frequencies is attained. By using 4-layer moving coils (2-layer is conventional) the low-pass choke is practically transferred into the inside of the moving coil.

Referring now to the drawings, FIG. 1 shows the loudspeaker enclosure with a housing 1. The loudspeaker 3 is introduced into the front wall 2 of the housing 1 from the front, i.e. from the left of the drawing, and attached to the front wall 2 by a clip connector 4. The clip connector 4 is formed by resilient projections 5 on the front wall 2 catching behind rigid edges on the loudspeaker frame. The loudspeaker 3 contains the permanent magnet 17 which represents the only metal part of the enclosure and which is surrounded by a cup-shaped magnetic screening 18. The air-tight seal between the front flange 6 of the loudspeaker 3 and the front wall 2 is formed by a seal 7, made from rubber for example, and laid in position. The housing component 8 is fitted onto the rear end of the housing 1 in the direction shown by arrow 9 and held in place by a number of interlocking clip connectors 10 distributed around the perimeter of the housing 1. The airtight seal is formed by the seal 11 laid between the housing 1 and the rear housing component 8. The rear housing component 8 is provided with a number of ribs 12 which act as stiffeners and also serve to create a diffuse sound field through numerous reflections thereby avoiding stationary waves. At the front, the housing 1 is fixed to the side wall 14 of a television receiver casing via an intermediate piece of a grid 13.

The outside shape of the rear housing component 8 matches the shape of the picture tube 15 provided in the television receiver. Therefore, optimum use of the relatively small space which exists between the picture tube 15 and side wall 14 of the television receiver is achieved.

Figure 2A:
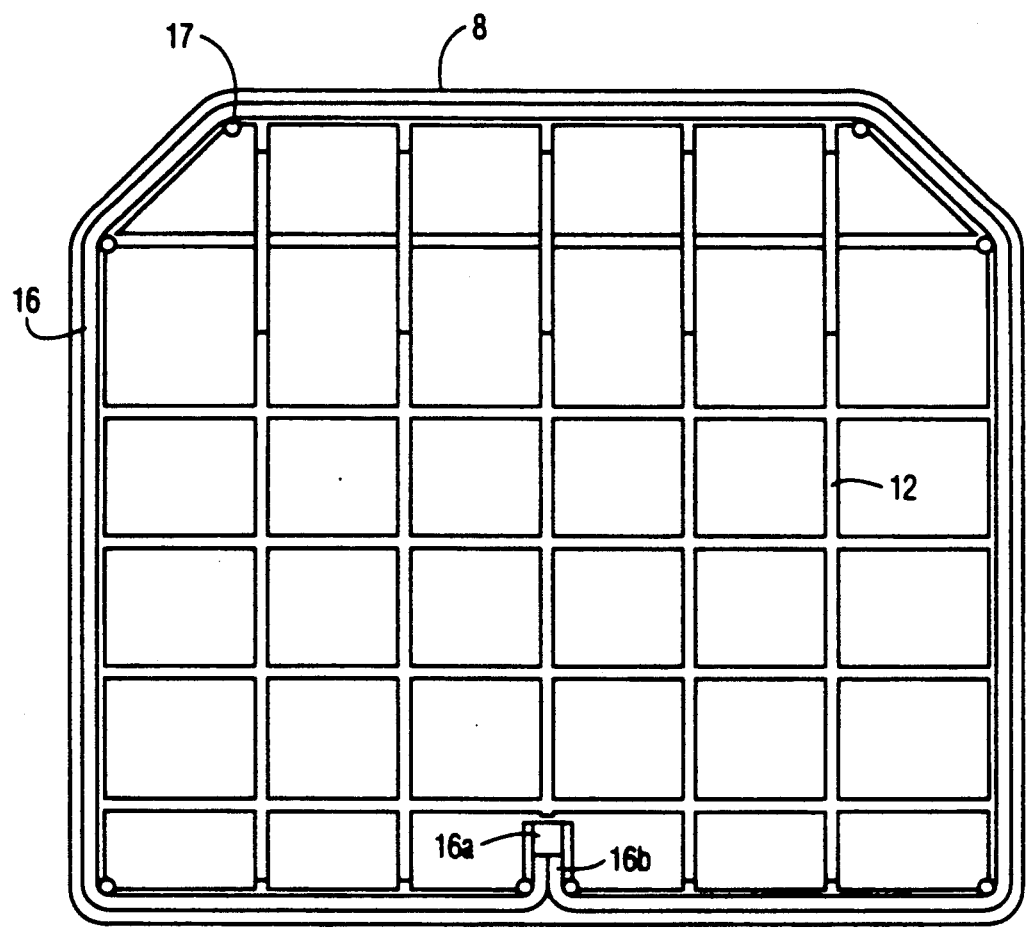
FIGS. 2A and 2B show views of the inside of the rear housing component.
Figure 2B:
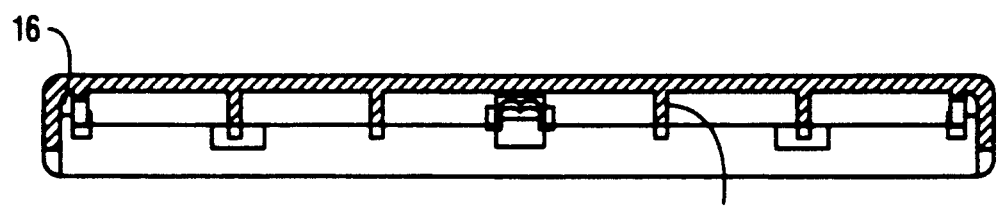

FIGS. 2A and 2B is an illustration of the inside of housing component 8. The inside of housing component 8 is provided with numerous ribs 12 which form a sort of mosaic (grid) field with the areas limited by the ribs. The ribs 12 serve, on the one hand to stiffen the housing component 8, and on the other hand to promote, in the manner described, a diffuse sound field within the enclosure and avoid stationary waves. There is a groove 16 around the perimeter of the housing component 8 in which the seal 11, for example, in the form of circular (in cross-section) piping, is laid by hand. The seal 11 is, for reasons of cost, not formed in one ring but rather supplied from a roll and then cut to size, i.e. with two free ends. In order to avoid a break in the seal at the point where the two ends meet, the perimeter groove 16 has two short sections 16a and 16b which are located directly adjacent each other. Therefore, when the two ends of the seal 11 are laid in the sections 16a, 16b directly adjacent each other and the parts 1 and 8 are fitted together, a complete air-tight seal is formed just as though a ring-type, endless seal had been used. Pegs 17 are provided around the edge of the groove 16. These guide the seal 11 which has to be manually laid into groove 16, and ease the positioning of the seal 11.

No metal parts are used for any of the described individual components or the air-tight assembly of the parts forming the enclosure.

I claim:

1. A passive multipath loudspeaker enclosure for a television receiver for minimizing magnetic interference in a proximal picture tube, comprising the combination of the following features:
    a) the only magnetic part within the enclosure is a loudspeaker magnet structure, which has a screen for magnetic stray fields, with other portions of a loudspeaker frame and a diaphragm being made from non-magnetic materials;
    b) a plurality of housing components, said components being made from non-magnetic material and fitted together without any metal parts using a plurality of interlocking clip connectors and an adhesive connection; and
    c) filters for dividing the frequency bands between a plurality of loudspeakers being realized by means of mechanical measures disposed at the loudspeakers.

2. The enclosure according to claim 1, wherein the filters are achieved by means of a coupling of centering diaphragms.

3. The enclosure according to claim 1, wherein a magneto-fluid is placed in an air gap within the loudspeaker magnet structure in order to minimize the air gap stray field.

4. The enclosure according to claim 1, wherein the loudspeaker is fixed to one of the walls of the enclosure by means of an interlocking clip connector.

5. The enclosure according to claim 1, wherein an airtight seal to the enclosure is formed either by one or more loudspeakers, or by a housing component at the rear, all of which are fitted to the housing enclosure using an interlocking clip connector with a seal.

6. The enclosure according to claim 1, wherein opposite walls of the housing components are stiffened by means of ribs located on the inside.

7. The enclosure according to claim 1, wherein the shape of at least one of the housing components matches the conical parts of the picture tube in a television receiver.

* * * * *